United States Patent
Horng et al.

(10) Patent No.: US 10,141,808 B2
(45) Date of Patent: Nov. 27, 2018

(54) MOTOR

(71) Applicant: Sunonwealth Electric Machine Industry Co., Ltd., Kaohsiung (TW)

(72) Inventors: Alex Horng, Kaohsiung (TW); Duo-Nian Shan, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 262 days.

(21) Appl. No.: 14/990,837

(22) Filed: Jan. 8, 2016

(65) Prior Publication Data
US 2016/0233735 A1 Aug. 11, 2016

(30) Foreign Application Priority Data

Feb. 9, 2015 (TW) .............................. 104104222 A

(51) Int. Cl.
*H02K 5/08* (2006.01)
*H02K 5/173* (2006.01)
*H02K 11/33* (2016.01)

(52) U.S. Cl.
CPC ............. *H02K 5/08* (2013.01); *H02K 5/1732* (2013.01); *H02K 11/33* (2016.01)

(58) Field of Classification Search
CPC .. H02K 5/16; H02K 5/22; H02K 5/08; H02K 5/1732; H02K 11/33; H02K 5/00; H02K 5/04; H02K 5/06; H02K 11/22; H02K 5/173; H02K 5/17
USPC .......................................................... 310/86
See application file for complete search history.

(56) References Cited

U.S. PATENT DOCUMENTS

| | | | |
|---|---|---|---|
| 4,823,032 A * | 4/1989 | Ward ....................... | H02K 5/08 310/43 |
| 5,760,512 A | 6/1998 | Ohi et al. | |
| 6,787,949 B2 * | 9/2004 | Bostwick ................. | H02K 5/10 310/59 |
| 6,849,974 B2 * | 2/2005 | Howe ....................... | H02K 5/08 29/596 |
| 2006/0071566 A1 * | 4/2006 | Ha .......................... | H02K 5/08 310/89 |
| 2012/0161558 A1 * | 6/2012 | Yamasaki .............. | H02K 5/225 310/71 |

(Continued)

FOREIGN PATENT DOCUMENTS

CN 201478972 U 5/2010
CN 102139737 A 8/2011
(Continued)

*Primary Examiner* — Naishadh Desai
(74) *Attorney, Agent, or Firm* — Alan D. Kamrath; Kamrath IP Lawfirm, P.A.

(57) ABSTRACT

A motor includes a stator, a separating member and a rotor. The stator includes an iron core. The separating member is made of insulating material and includes a first separating part, a second separating part and a third separating part. The second separating part is arranged between the first and third separating parts, and the iron core is arranged between the first and second separating parts. The rotor is rotatably coupled with the separating member and includes a permanent magnet unit arranged between the first and second separating parts. As such, the separating member is able to provide an improved insulation effect for the motor, thus prolonging the service life of the motor.

13 Claims, 15 Drawing Sheets

(56) References Cited

U.S. PATENT DOCUMENTS

| | | | |
|---|---|---|---|
| 2012/0161689 A1* | 6/2012 | Yamasaki | B62D 5/0406 318/724 |
| 2012/0286603 A1* | 11/2012 | Suga | H02K 11/0073 310/71 |
| 2012/0307476 A1* | 12/2012 | Masuzawa | H02K 11/33 361/816 |
| 2013/0315759 A1* | 11/2013 | Hayakawa | H02K 3/46 417/420 |
| 2014/0103767 A1* | 4/2014 | Nadeau | H02K 1/2773 310/156.02 |
| 2014/0151146 A1* | 6/2014 | Tanaka | B62D 5/0406 180/443 |
| 2015/0357892 A1* | 12/2015 | Nakano | H02K 29/03 180/443 |
| 2016/0233735 A1 | 8/2016 | Horng et al. | |

FOREIGN PATENT DOCUMENTS

| | | |
|---|---|---|
| CN | 202602439 U | 12/2012 |
| CN | 204517547 U | 7/2015 |
| TW | M297577 U | 9/2006 |

* cited by examiner

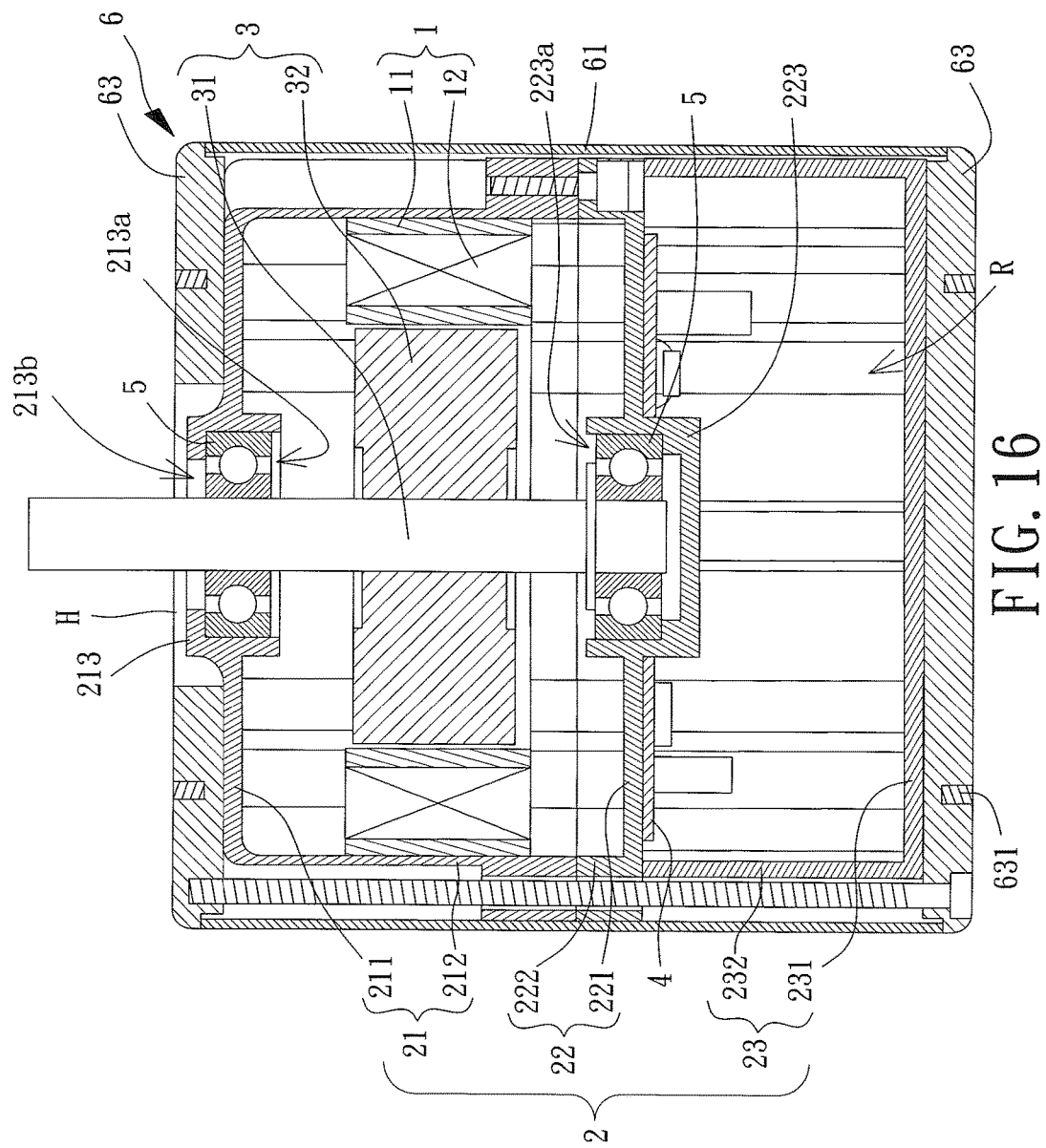

MOTOR

CROSS REFERENCE TO RELATED APPLICATIONS

The application claims the benefit of Taiwan application serial No. 104104222, filed on Feb. 9, 2015, and the subject matter of which is incorporated herein by reference.

BACKGROUND OF THE INVENTION

1. Field of the Invention

The present invention generally relates to a motor and, more particularly, to a motor having a separating member.

2. Description of the Related Art

A conventional motor generally includes an outer metallic housing, a stator iron core, a driving circuit and a bearing. The stator iron core, the driving circuit and the bearing are arranged in the metallic housing. In this arrangement, electricity can be conducted between the stator iron core, the driving circuit and the bearing, leading to a leakage current.

To overcome the problem, another conventional motor 9 is proposed. The motor 9 includes a stator 91 and a separating member 92. The separating member 92 is made of a non-conducting plastic material and used to receive the stator 91. A metallic housing 93 may be coupled with the separating member 92. In this regard, the separating member 92 is able to provide an insulating effect to prevent the electric current from flowing between the stator 91 and the housing 93. Such a motor 9 can be seen in Taiwan Patent No. M297577.

The separating member 92 is fitted around the stator 91 and includes two openings along an axial direction of the motor 9. Due to the two openings, the separating member 92 is not able to seal the stator 91 in all sides and is not able to provide an omnidirectional insulating effect for the stator 91. In other words, a leakage current may be conducted at the two axial sides of the separating member 92, and possibly on the driving circuit and the bearing. Moreover, moisture may come into the motor 9 via the two openings of the separating member 92, causing oxidization of or damage to the internal components of the motor 9. Consequently, the service life of the motor 9 is affected.

Besides, the stator 91 includes a first threading portion 911, and the separating member 92 includes a second threading portion 921. The first and second threading portions 911 and 912 are aligned with each other, such that the separating member 92 can be fixed to the stator 91 by screwing. The separating member 92 can only be used to receive the stator 91. Generally, some components such as a bearing (not shown) may be disposed in the motor 9. However, the structure of the separating member 92 does not provide a convenient assembly of the bearing, resulting in difficult production of the motor In light of the disadvantages of the motor 9 such as an incomplete insulating effect, short service life and difficult production, it is necessary to improve the motor 9.

SUMMARY OF THE INVENTION

It is therefore the objective of this invention to provide a motor including a separating member having a first separating part and a second separating part for enclosing the stator and the bearing, in which a receiving portion is formed between the second separating part and a third separating part of the separating member. As such, the separating member is able to completely enclose the stator, the bearing and the related components of the motor.

In an embodiment of the invention, a motor including a stator, a separating member and a rotor is disclosed. The stator includes an iron core. The separating member is made of insulating material and includes a first separating part, a second separating part and a third separating part. The second separating part is arranged between the first and third separating parts, and the iron core is arranged between the first and second separating parts. The rotor is rotatably coupled with the separating member and includes a permanent magnet unit arranged between the first and second separating parts.

In a form shown, the second and third separating parts jointly form a receiving portion adapted to receive a driving circuit board, an electrical control module or a power converting unit.

In the form shown, each of the first, second and third separating parts includes a lid extending in a radial direction.

In the form shown, the lid of the first separating part is provided with a lateral wall extending towards the second separating part in an axial direction perpendicular to the radial direction, or the lid of the second separating part is provided with a lateral wall extending towards the first separating part in the axial direction.

In the form shown, the first and second separating parts are spaced from each other via the lateral wall of the first or second separating part.

In the form shown, the second separating part is in a flat form when the first separating part is provided with the lateral wall thereof, or the first separating part is in a flat form when the second separating part is provided with the lateral wall thereof.

In the form shown, the lid of the first separating part is provided with a lateral wall extending towards the second separating part in an axial direction perpendicular to the radial direction, and the lid of the second separating part is also provided with a lateral wall extending towards the first separating part in the axial direction.

In the form shown, the lid of the third separating part is provided with a lateral wall extending towards the second separating part in an axial direction, or the lid of the second separating part is provided with a lateral wall extending towards the third separating part in the axial direction.

In the form shown, the second and third separating parts are spaced from each other via the lateral wall.

In the form shown, the second separating part is in a flat form when the third separating part is provided with the lateral wall thereof, or the third separating part is in a flat form when the second separating part is provided with the lateral wall thereof.

In the form shown, the lid of the second separating part is provided with a lateral wall extending towards the third separating part in an axial direction perpendicular to the radial direction, and the lid of the third separating part is also provided with a lateral wall extending towards the second separating part in the axial direction.

In the form shown, the rotor further includes a shaft, and a bearing seat is arranged at the center of the lid of each of the first and second separating parts. The bearing seat includes an assembly opening, a bearing is received in the bearing seat via the assembly opening, and the shaft is rotatably received in the bearings of the bearing seats of the first and second separating parts.

In the form shown, the assembly opening of the bearing seat of the first separating part faces towards or away from the second separating part, and the assembly opening of the bearing seat of the second separating part faces the first or third separating part.

In the form shown, the bearing seat of the first separating part further includes a shaft opening through which the shaft of the rotor extends, and the assembly opening and the shaft opening of the first separating part are arranged at two sides of the bearing seat of the first separating part.

In the form shown, the bearing seat of the second separating part further includes a shaft opening through which the shaft of the rotor extends, and the assembly opening and the shaft opening of the second separating part are arranged at two sides of the bearing seat of the second separating part.

In the form shown, the rotor further includes a shaft, and a bearing seat is arranged at the center of the lid of each of the first and third separating parts. The bearing seat includes an assembly opening, and a bearing is received in the bearing seat via the assembly opening. As such, the shaft can be rotatably received in the bearings of the bearing seats of the first and third separating parts.

In the form shown, the assembly opening of the bearing seat of the first separating part is spaced from the second separating part at a distance larger or smaller than a distance between the lid of the first separating part and the second separating part, and the assembly opening of the bearing seat of the third separating part is spaced from the second separating part at a distance larger or smaller than a distance between the lid of the third separating part and the second separating part.

In the form shown, the bearing seat of the first separating part further includes a shaft opening through which the shaft of the rotor extends, and the assembly opening and the shaft opening of the first separating part are arranged at two sides of the bearing seat of the first separating part.

In the form shown, the bearing seat of the third separating part further includes a shaft opening through which the shaft of the rotor extends, and the assembly opening and the shaft opening of the third separating part are arranged at two sides of the bearing seat of the third separating part.

In the form shown, the motor further includes a metallic housing, and the separating member is received in the metallic housing.

In the form shown, the metallic housing includes a first housing part and a second housing part detachably attached to the first housing part. The first, second and third separating parts are received in the first housing part. The first housing part forms an opening at an open end adjacent to the third separating part, and the second housing part covers the opening of the first housing part.

In the form shown, each of the first and second housing parts forms a hollow structure. Each of the first and second housing parts forms an opening at an open end thereof. The open ends of the first and second housing parts abut with each other, and the first and second housing parts jointly enclose the first, second, and third separating parts.

In the form shown, the metallic housing includes a first housing part and two covers. The first housing part is in a form of a hollow sleeve having two openings at two ends thereof. The first housing part encloses the first, second and third separating parts, and the two covers cover the two openings of the first housing part, respectively.

In the form shown, the first and second separating parts are coupled with each other, and the first and third separating parts are coupled with each other, thereby coupling the first, second and third separating parts together.

In the form shown, the first and second separating parts are coupled with each other, and the second and third separating parts are coupled with each other, thereby coupling the first, second and third separating parts together.

In the form shown, the first and third separating parts are coupled with each other, and the second and third separating parts are coupled with each other, thereby coupling the first, second and third separating parts together.

In the form shown, the first, second and third separating parts are coupled with each other.

In the form shown, the first, second and third separating parts are coupled with each other by screwing, fastening, press fitting or tenoning.

Based on the above structures, in the motor of each embodiment of the invention, the first and second separating parts are used to enclose the components such as the stator and the bearings, and the components such as the driving circuit board, the electrical control module or the power converting unit may be received in the receiving portion formed between the second and third separating parts. In this arrangement, the separating member is able to completely enclose the stator, the bearings and said components and to provide a complete insulation effect for the stator, the bearings and said components. As such, leakage current will not occur, and moisture is not liable to enter the motor, effectively improving the insulation effect of the motor and prolonging the service life of the motor.

BRIEF DESCRIPTION OF THE DRAWINGS

The present invention will become more fully understood from the detailed description given hereinafter and the accompanying drawings which are given by way of illustration only, and thus are not limitative of the present invention, and wherein:

FIG. 16 is a cross sectional view of a motor according to a ninth embodiment of the invention.

Figure 1:
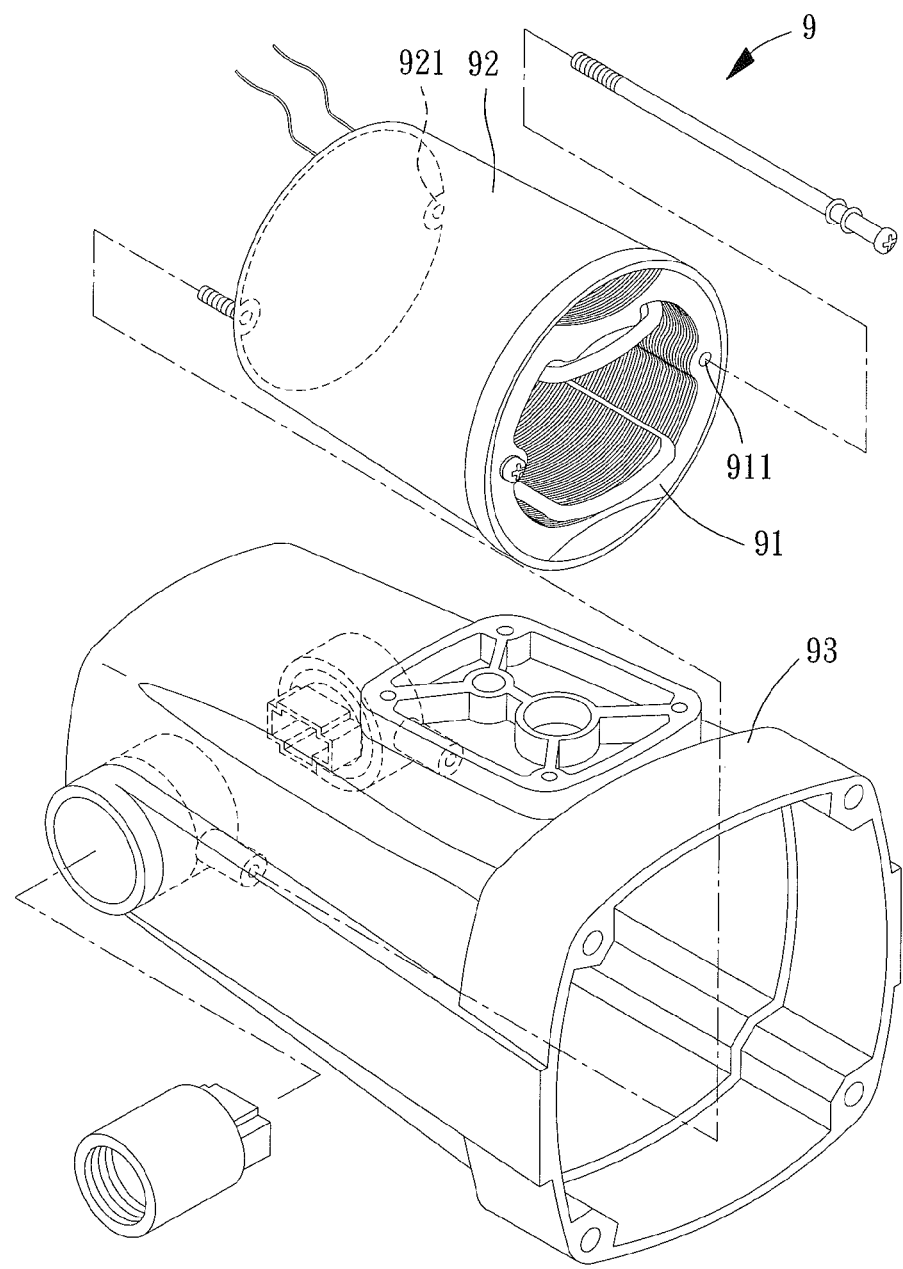
FIG. 1 is an exploded view of a conventional motor.

In the various figures of the drawings, the same numerals designate the same or similar parts. Furthermore, when the terms "first", "second", "third", "inner", "outer", and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

Figure 2:
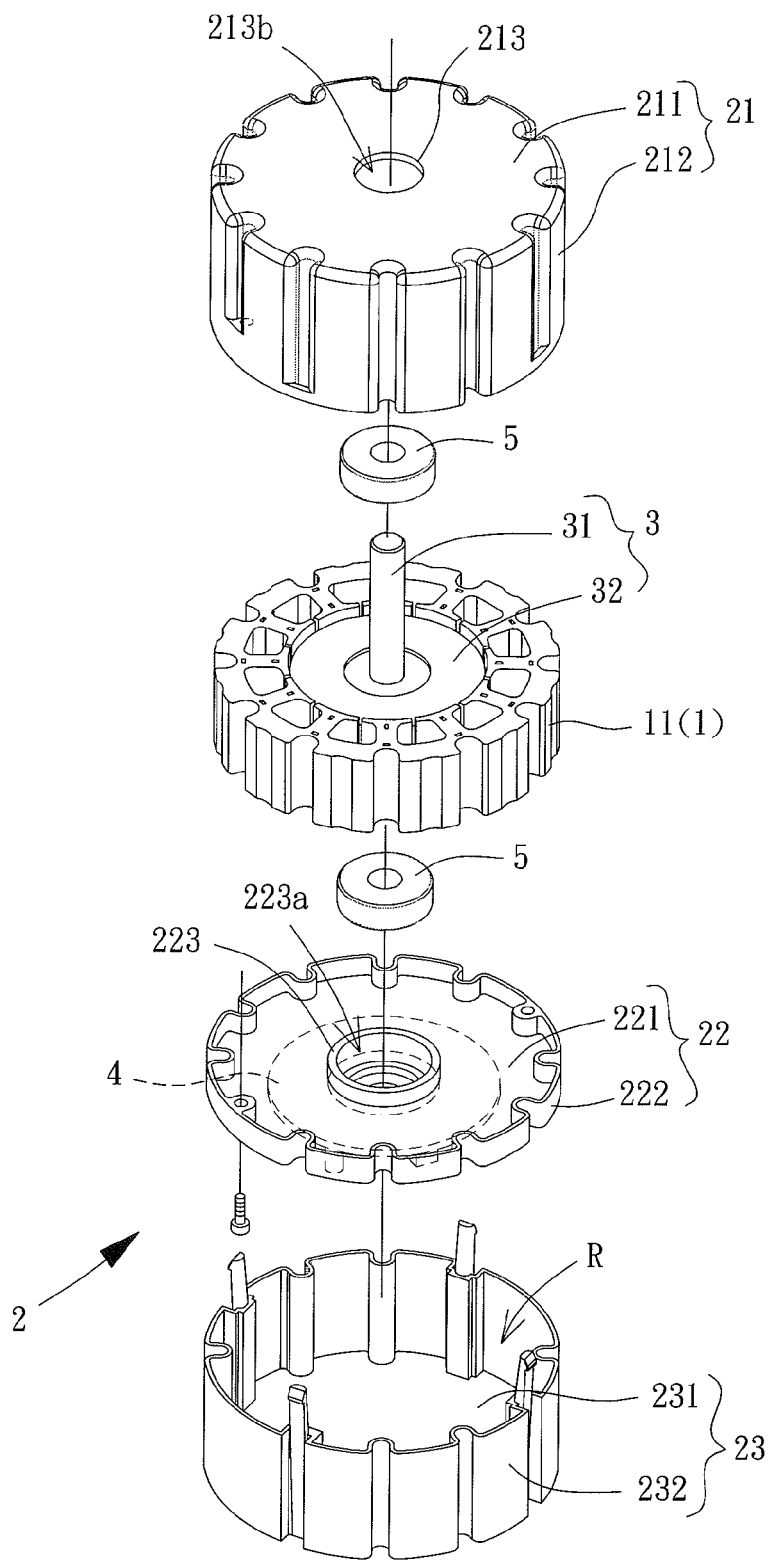
FIG. 2 is an exploded view of a motor according to a first embodiment of the invention.
Figure 3:
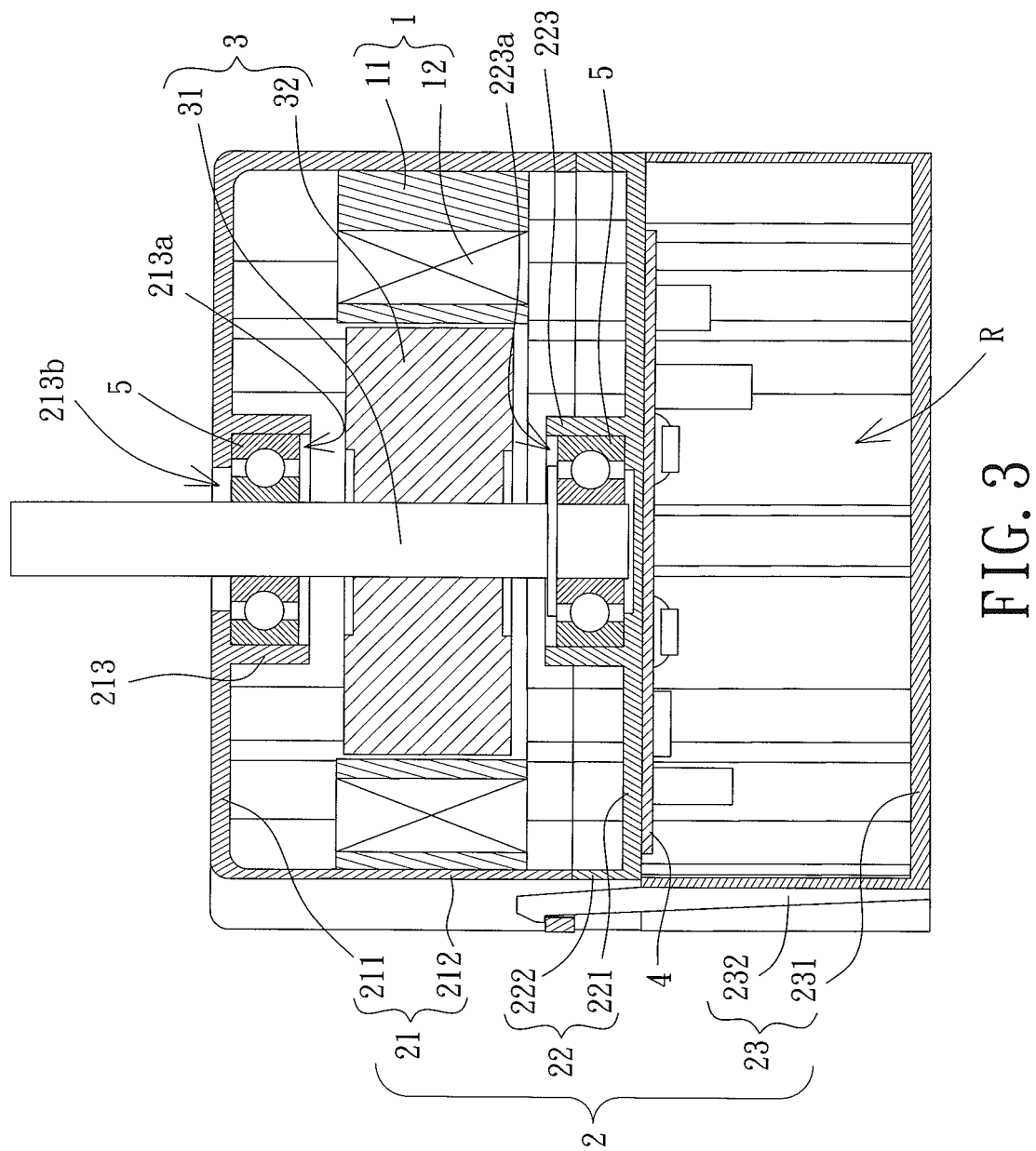
FIG. 3 is a cross sectional view of the motor of the first embodiment of the invention.

FIGS. 2 and 3 show a motor according to a first embodiment of the invention. The motor includes a stator 1, a separating member 2 and a rotor 3. The stator 1 is arranged in the separating member 2. The rotor 3 is rotatably coupled with the separating member 2. The motor may be an inner-rotor-type or an outer-rotor-type motor. In the embodiment, the motor is an inner-rotor-type motor.

The stator 1 includes an iron core 11 wound with a coil 12. The iron core 11 is disposed in the separating member 2. The separating member 2 is made of insulating material and includes a first separating part 21, a second separating part 22 and a third separating part 23. The first, second and third separating parts 21, 22 and 23 may be fixed to each other. The second separating part 22 is sandwiched between the first and third separating parts 21 and 23. The iron core 11 is arranged between the first and second separating parts 21 and 22. A receiving portion "R" is formed between the second and third separating parts 22 and 23 for receiving the related components of the motor such as the driving circuit board, the electrical control module or the power converting unit. For example, in the embodiment, a driving circuit board 4 is received in the receiving portion "R" and is coupled with the second separating part 22. However, the driving circuit board 4 may also be coupled with the third separating part 23. The electronic components of the driving circuit board 4 may be electrically connected to the coil 12 of the stator 1 via lead wires, electrical pins or posts, as it can be readily appreciated by one skilled in the art.

The first separating part 21 includes a lid 211, the second separating part 22 includes a lid 221, and the third separating part 23 also includes a lid 231. Each of the lids 211, 221 and 231 extends in a radial direction of the motor. A lateral wall 212 may be arranged on the lid 211 of the first separating part 21. The lateral wall 212 extends from the lid 211 towards the second separating part 22 along an axial direction of the motor. Alternatively, a lateral wall 222 is arranged on the lid 221 of the second separating part 22. The lateral wall 222 extends from the lid 221 towards the first separating part 21 along the axial direction of the motor. In the embodiment, both the lateral walls 212 and 222 are provided. The lid 211 of the first separating part 21 is spaced from the lid 221 of the second separating part 22 via the lateral walls 212 and 222, so that the lids 221 and 222 are spaced from each other by a predetermined distance. Based on this, the first and second separating parts 21 and 22 form a compartment therebetween. The iron core 11 can be disposed between the first and second separating parts 21 and 22 by loose fitting or press fitting.

Similarly, a lateral wall 232 may be arranged on the lid 231 of the third separating part 23. The lateral wall 232 extends from the lid 231 towards the second separating part 22 along the axial direction of the motor. Alternatively, the lid 221 of the second separating part 22 may be further provided with another lateral wall which extends from the lid 221 towards the third separating part 23 along the axial direction of the motor. However, such a lateral wall (extending from the lid 221 towards the third separating part 23) is not provided in this embodiment. Therefore, the lid 221 of the second separating part 22 is spaced from the lid 231 of the third separating part 23 by the lateral wall 232 of the third separating part 23. As such, the lid 221 of the second separating part 22 is spaced from the lid 231 of the third separating part 23 by a predetermined distance, forming the receiving portion "R" between the second and third separating parts 22 and 23 for receiving the driving circuit board, the electrical control module or the power converting unit of the motor.

The rotor 3 may include a shaft 31 and a permanent magnet unit 32 circumferentially coupled with the outer periphery of the shaft 31. An air gap is formed between the permanent magnet unit 32 and the iron core 11 of the stator 1. A radial direction of the motor is defined as the direction perpendicular to the extending direction of the shaft 31, and an axial direction of the motor is defined as the direction parallel to the extending direction of the shaft 31, as it can be readily appreciated by the skilled persons. The permanent magnet unit 32 is arranged between the first and second separating parts 21 and 22. Namely, both the permanent magnet unit 32 and the iron core 11 of the stator 1 are arranged between the first and second separating parts 21 and 22. A bearing seat 213 is arranged at the center of the first separating part 21, and a bearing seat 223 is arranged at the center of the second separating part 22. Each of the bearing seats 213 and 223 may be provided with a bearing 5. Thus, the shaft 31 may be received in the bearings 5 of the bearing seats 213 and 223, and the rotor 3 is able to rotatably couple with the separating member 2. Besides, the bearing seat 213 includes an assembly opening 213a, and the bearing seat 223 includes an assembly opening 223a. Each bearing 5 may be fixed in a corresponding bearing seat 213 or 223 through the assembly opening 213a or 223a. Since the first and second separating parts 21 and 22 are independent from each other, the assembly opening 213a of the bearing seat 213 of the first separating part 21 may face the second separating part 22, and the assembly opening 223a of the bearing seat 223 of the second separating part 22 may face the first separating part 21. In this arrangement, each of the two bearings 5 may be press fitted in a corresponding bearing seat 213 or 223 via the assembly opening 213a or 223a, and the first and second separating parts 21 and 22 can then be coupled with each other to form the motor. Furthermore, the bearing seat 213 of the first separating part 21 further includes a shaft opening 213b. The assembly opening 213a and the shaft opening 213b are formed at two sides of the bearing seat 213. The shaft 31 may extend through the shaft opening 213b. As such, the shaft 31 may extend through the bearing seat 213 via the assembly opening 213a and the shaft opening 213b, thereby protruding out of the separating member 2. In the embodiment, the outer surface of the bearing seat 213 of the first separating part 21, which faces away from the stator 1, may be flush with the outer surface of the lid 211 facing away from the stator 1. In other words, the bearing seat 213 of the first separating part 21 is radially aligned with the lid 211. Namely, the bearing seat 213 of the first separating part 21 may be located at the same level as the lid 211. Similarly, the outer surface of the bearing seat 223 of the second separating part 22, which faces away from the stator 1, may be flush with the outer surface of the lid 221 facing away from the stator 1. In other words, the bearing seat 223 of the second separating part 22 is radially aligned with the lid 221.

It is noted that the first separating part 21 may be further coupled with the third separating part 23 while coupling with the second separating part 22, thus coupling the first, second and third separating parts 21, 22 and 23 together. The first separating part 21 may be coupled with the second separating part 22 by screwing, fastening, press fitting or tenoning. Similarly, the first separating part 21 may be coupled with the third separating part 23 by screwing, fastening, press fitting or tenoning. For example, in this embodiment, the first and second separating parts 21 and 22 are coupled with each other by screwing, and the first separating part 21 is coupled with the third separating part 23 by fastening. However, the third separating part 23 is preferably coupled with the first separating part 21 by fastening, screwing or tenoning for convenient attachment and detachment.

In the use of the motor of the first embodiment, the iron core 11 may be magnetically linked with the permanent magnet unit 32 after the coil 12 is electrified. The structures and operations of the stator 1 and the rotor 3 are not described herein as they can be readily appreciated by the skilled persons.

Based on the above structure, the separating member 2 in the first embodiment of the invention includes the first, second and third separating parts 21, 22 and 23 that are respectively provided with the lids 211, 221 and 231 extending in a radial direction of the motor. In addition, the bearing seat 213 is provided at the center of the first separating part 21, and the bearing seat 223 is provided at the center of the second separating part 22. Each of the bearing seats 213 and 223 is used to receive a respective bearing 5 to which the shaft 31 of the rotor 3 is coupled. Based on this, the first and second separating parts 21 and 22 may be used to jointly enclose the stator 1 and the bearings 5. Also, the electrical elements such as the driving circuit board, the electrical control module and the power converting unit of the motor may be received in the receiving portion "R" formed between the second and third separating parts 22 and 23. As such, the separating member 2 is able to completely enclose the stator 1, the bearings 5 and the electrical elements and provide an insulation effect for said components. Advantageously, leakage current is prevented and the insulation effect of the motor is improved. Moreover, since the stator 1 is completely sealed by the separating member 2 at all sides, the moisture is not liable to enter the motor, thereby prolonging the service life of the motor.

The third separating part 23 may be detachably attached to the first separating part 21 by screwing, fastening or tenoning. In this arrangement, the third separating part 23 may be removed from the motor to proceed the repair or replacement of the driving circuit board, the electrical control module or the power converting unit, providing convenient maintenance of the motor.

The iron core 11 may be arranged between the first and second separating parts 21 and 22 by press fitting or loose fitting. Also, the bearing seat 213 may be integrally formed on the first separating part 21 for coupling with the bearing 5, and the bearing seat 223 may be integrally formed on the second separating part 22 for coupling with the other bearing 5. As such, convenient assembly and production of the motor is achieved.

Figure 4:
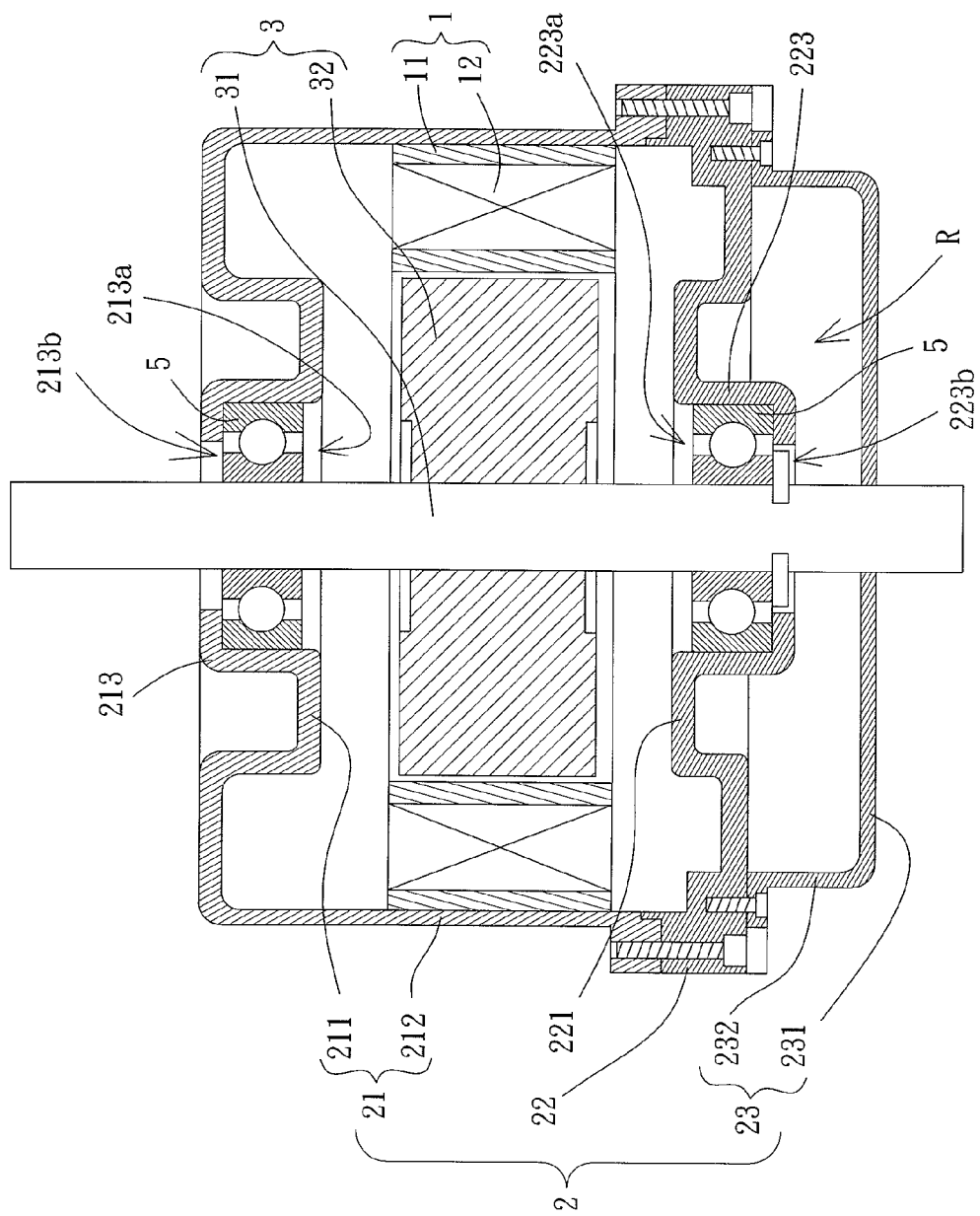
FIG. 4 is a cross sectional view of a motor according to a second embodiment of the invention.

FIG. 4 shows a motor according to a second embodiment of the invention. The second embodiment differs from the first embodiment in that the lid 221 of the second separating part 22 is not coupled with any lateral wall. In this regard, the lid 211 of the first separating part 21 is spaced from the lid 221 of the second separating part 22 by the lateral wall 212 of the first separating part 21, forming a distance between the lids 211 and 221. In the arrangement, the first separating part 21 may be coupled with the second separating part 22, which is further coupled with the third separating part 23. Thus, the first, second and third separating parts 21, 22 and 23 may be coupled with each other. In other words, any two of the first, second and third separating parts 21, 22 and 23 are coupled with each other (i.e. the first separating part 21 may also be coupled with the third separating part 23, and the second separating part 22 may also be coupled with the third separating part 23).

In the embodiment, the bearing seat 223 also includes a shaft opening 223b. The shaft opening 223b and the assembly opening 223a are formed at two sides of the bearing seat 223. The shaft 31 may extend through the assembly openings 213a and 223a and the shaft openings 213b and 223b of the bearing seats 213 and 223, so that the shaft 31 extends through the third separating part 23. In this arrangement, two ends of the shaft 31 extend out of the separating member 2. Furthermore, the bearing seat 213 of the first separating part 21 may protrude outwards from the lid 211 in an axial direction of the motor, such that the axial distance between the bearing seat 213 and the stator 1 is larger than that between the surface of the lid 211 and the stator 1. Similarly, the bearing seat 223 of the second separating part 22 may protrude from the lid 221 towards the third separating part 3 along the axial direction of the motor, such that the axial distance between the bearing seat 223 and the stator 1 is larger than that between the surface of the lid 221 and the stator 1.

Figure 5:
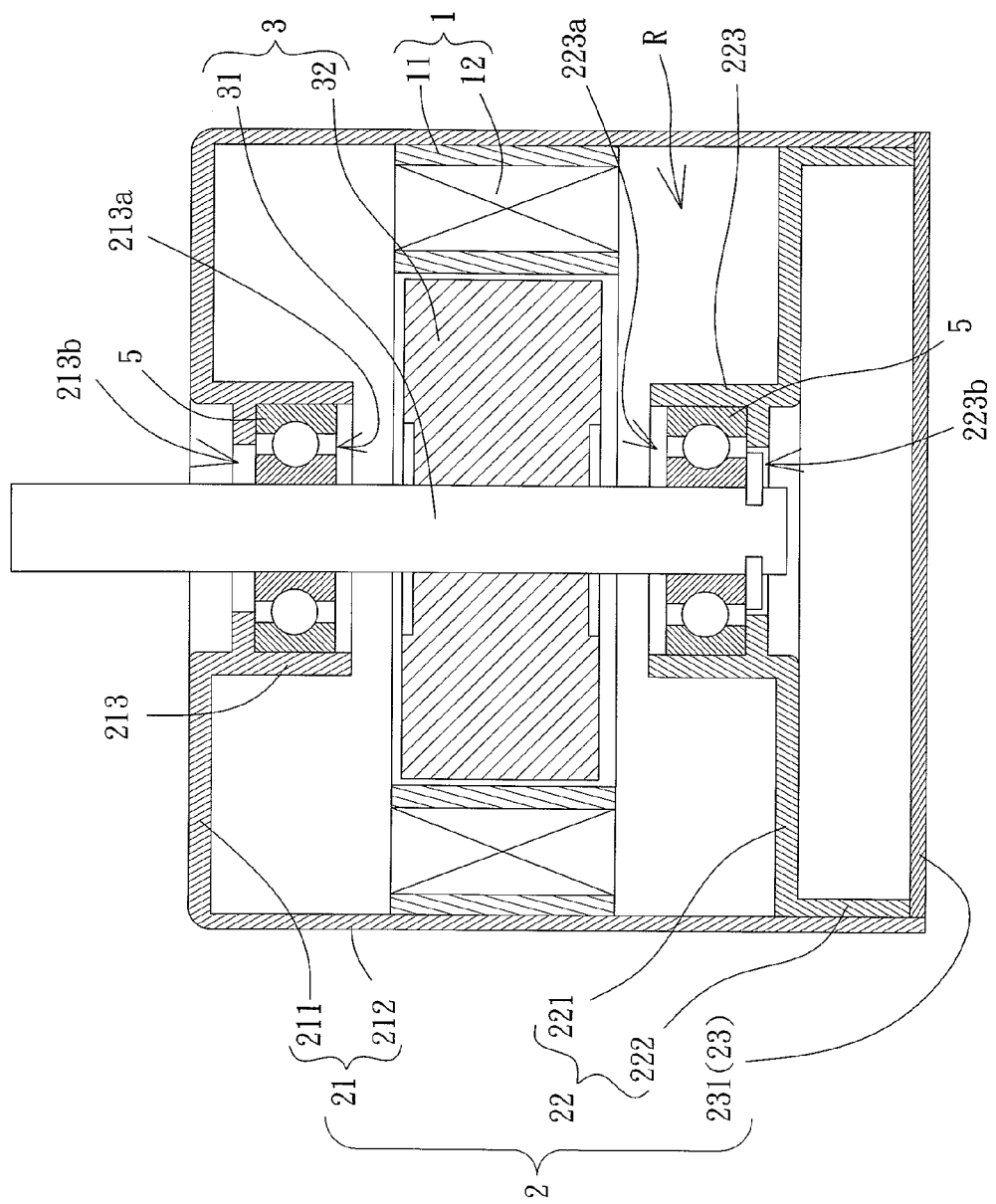
FIG. 5 is a cross sectional view of a motor according to a third embodiment of the invention.

FIG. 5 shows a motor according to a third embodiment of the invention. This embodiment differs from the first embodiment in that a lateral wall 222 is arranged on the lid 221 of the second separating part 22. The lateral wall 222 extends from the lid 221 towards the third separating part 23 along the axial direction of the motor. In this arrangement, the third separating part 23 may be in a flat form (without any lateral wall). Therefore, it is not required to form any lateral wall on the lid 231 of the third separating part 23. The lid 221 of the second separating part 22 is spaced from the lid 231 of the third separating part 23 by the lateral wall 222, forming a distance between the lids 221 and 231. Besides, the assembly opening 213a of the first separating part 21 may face the second separating part 22, and the assembly opening 223a of the second separating part 22 may face the first separating part 21. Alternatively, the assembly opening 213a of the first separating part 21 may face away from the second separating part 22, and the assembly opening 223a of the second separating part 22 may face the third separating part 23. Furthermore, as compared with the above first and second embodiments where the first, second and third separating parts 21, 22 and 23 are coupled together by screwing or fastening, the second and third separating parts 22 and 23 in this embodiment can be press fitted inside the first separating part 21.

Moreover, the bearing seat 213 of the first separating part 21 may protrude from the lid 211 towards the stator 1 along the axial direction of the motor, so that the axial distance between the bearing seat 213 and the stator 1 is smaller than that between the surface of the lid 211 and the stator 1. Similarly, the bearing seat 223 of the second separating part 22 may protrude from the lid 221 towards the stator 1 along the axial direction of the motor, so that the axial distance between the bearing seat 223 and the stator 1 is smaller than that between the lid 221 and the stator 1. Besides, the lateral wall 212 of the first separating part 21 may extend to the third separating part 23 in the axial direction of the motor.

Figure 6:
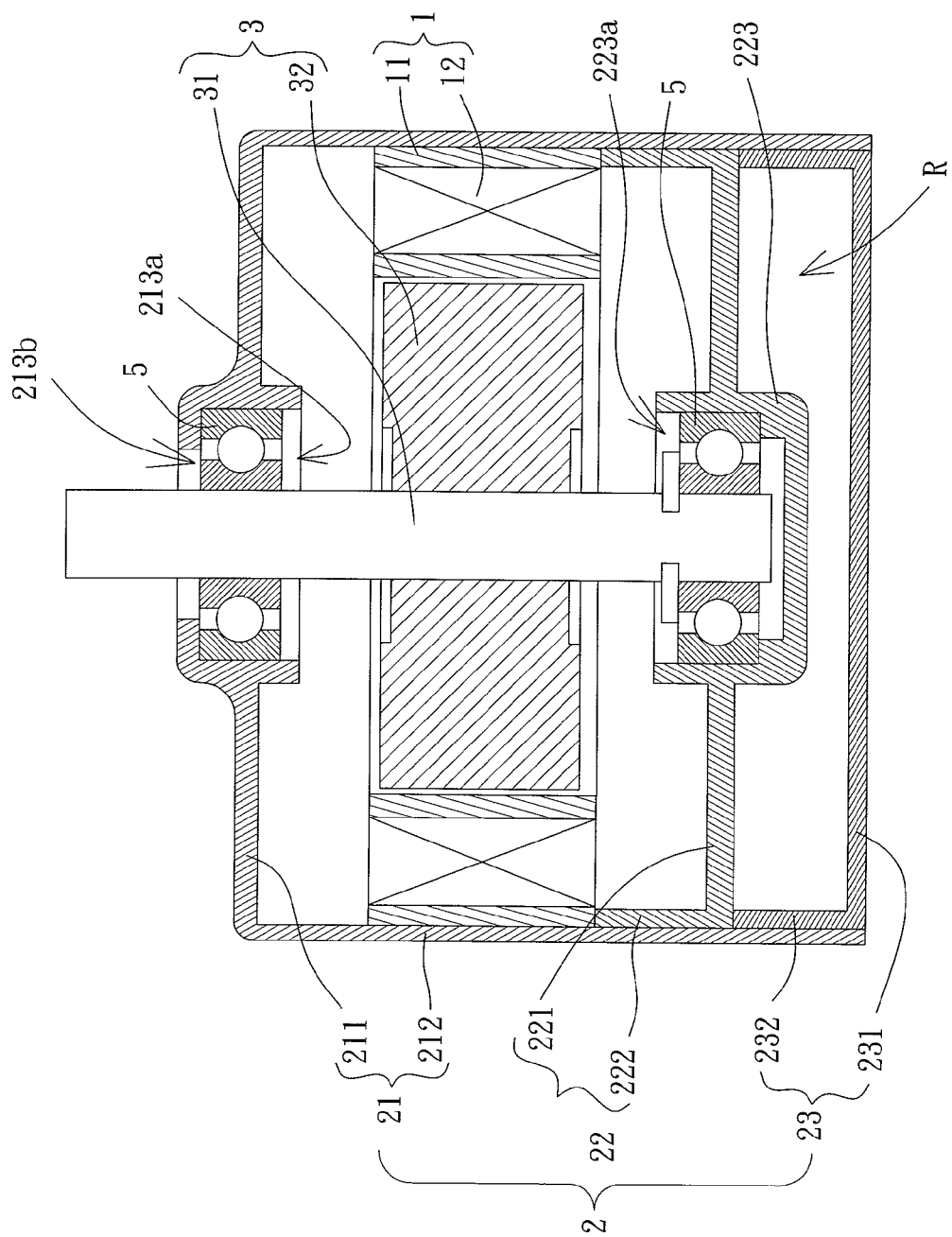
FIG. 6 is a cross sectional view of the motor of the third embodiment of the invention according to another implementation of the motor.

FIG. 6 shows a different implementation of the motor of the third embodiment. In the implementation, a lateral wall 222 may be arranged on the lid 221 of the second separating part 22. The lateral wall 222 extends from the lid 221 towards the first separating part 21 along the axial direction of the motor. Based on this, a lateral wall 232 may be arranged on the lid 231 of the third separating part 23. The lateral wall 232 extends from the lid 231 towards the second separating part 22 along the axial direction of the motor. In this arrangement, the lids 211 and 221 of the first and second separating parts 21 and 22 are spaced from each other. In this regard, the lateral wall 222 of the second separating part 22 is located therebetween, and the lid 221 of the second separating part 22 is spaced from the lid 231 of the third separating part 23 by the lateral wall 232 of the third separating part 23.

Figure 7:
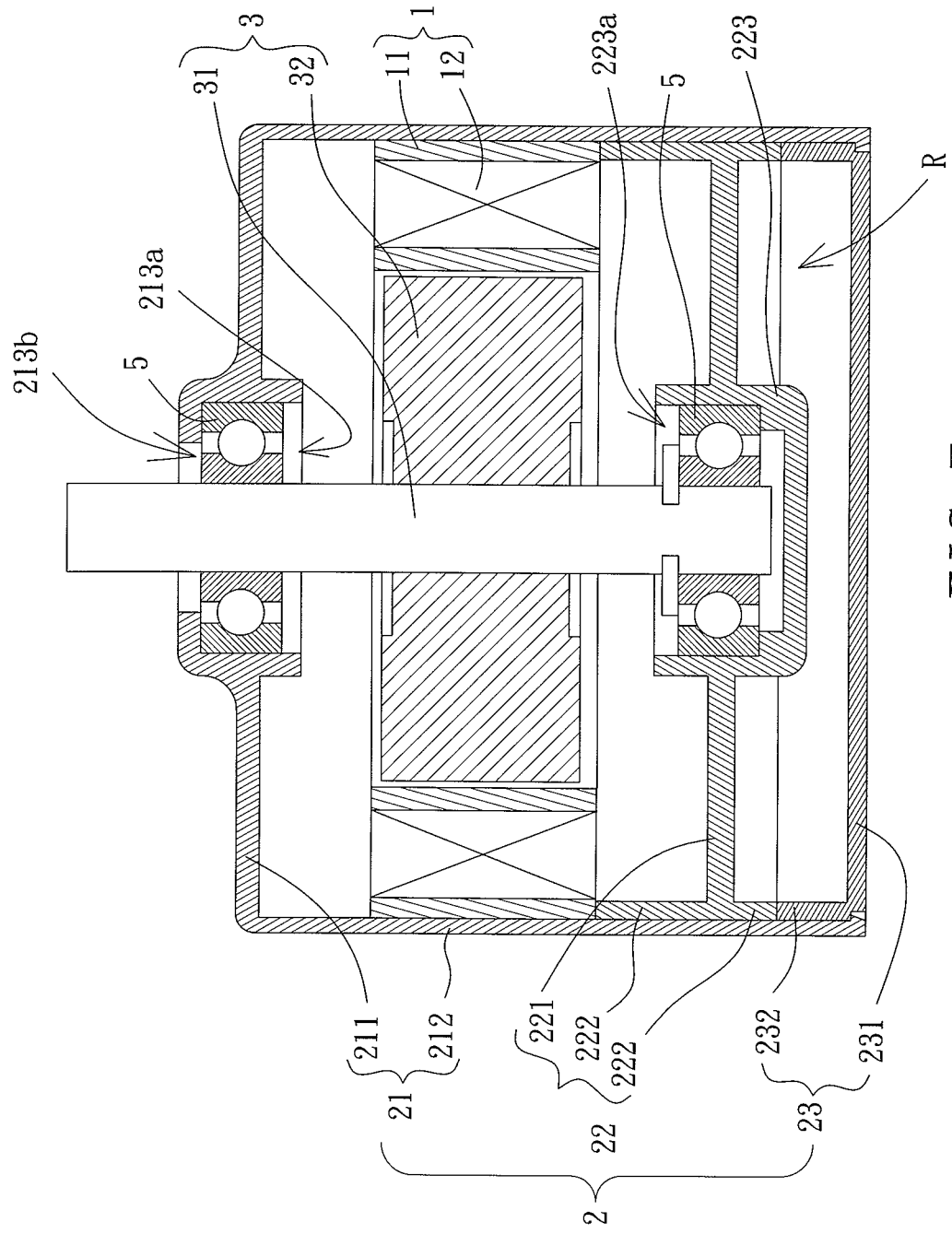
FIG. 7 is a cross sectional view of the motor of the third embodiment of the invention according to a further implementation of the motor.

FIG. 7 shows a further implementation of the motor of the third embodiment. The implementation differs from the previous implementation in that two lateral walls 222 may be arranged on the lid 221 of the second separating part 22. One of the two lateral walls 222 extends from the lid 221 towards the first separating part 21, and the other lateral wall 222 extends from the lid 221 towards the third separating part 23. In this arrangement, the lids 211 and 221 of the first and second separating parts 21 and 22 are spaced from each other. In this regard, one of the two lateral walls 222 is located therebetween, and the lid 221 of the second separating part 22 is spaced from the lid 231 of the third separating part 23 by the other lateral wall 222 of the second separating part 22. Thus, in each embodiment of the invention, the lid 211 of the first separating part 21 may be provided with a lateral wall 212 extending towards the second separating part 22, the second separating part 22 may be provided with a lateral wall 222 extending towards the first separating part 21 or the third separating part 23, and the third separating part 23 may be provided with a lateral wall 232 extending towards the second separating part 22. Furthermore, as compared with the previous implementations where the first and third separating parts 21 and 23 may be coupled to each other by screwing or fastening, the first and third separating parts 21 and 23 in this implementation are located in the first separating part 21 and are coupled with each other by fastening.

Figure 8:
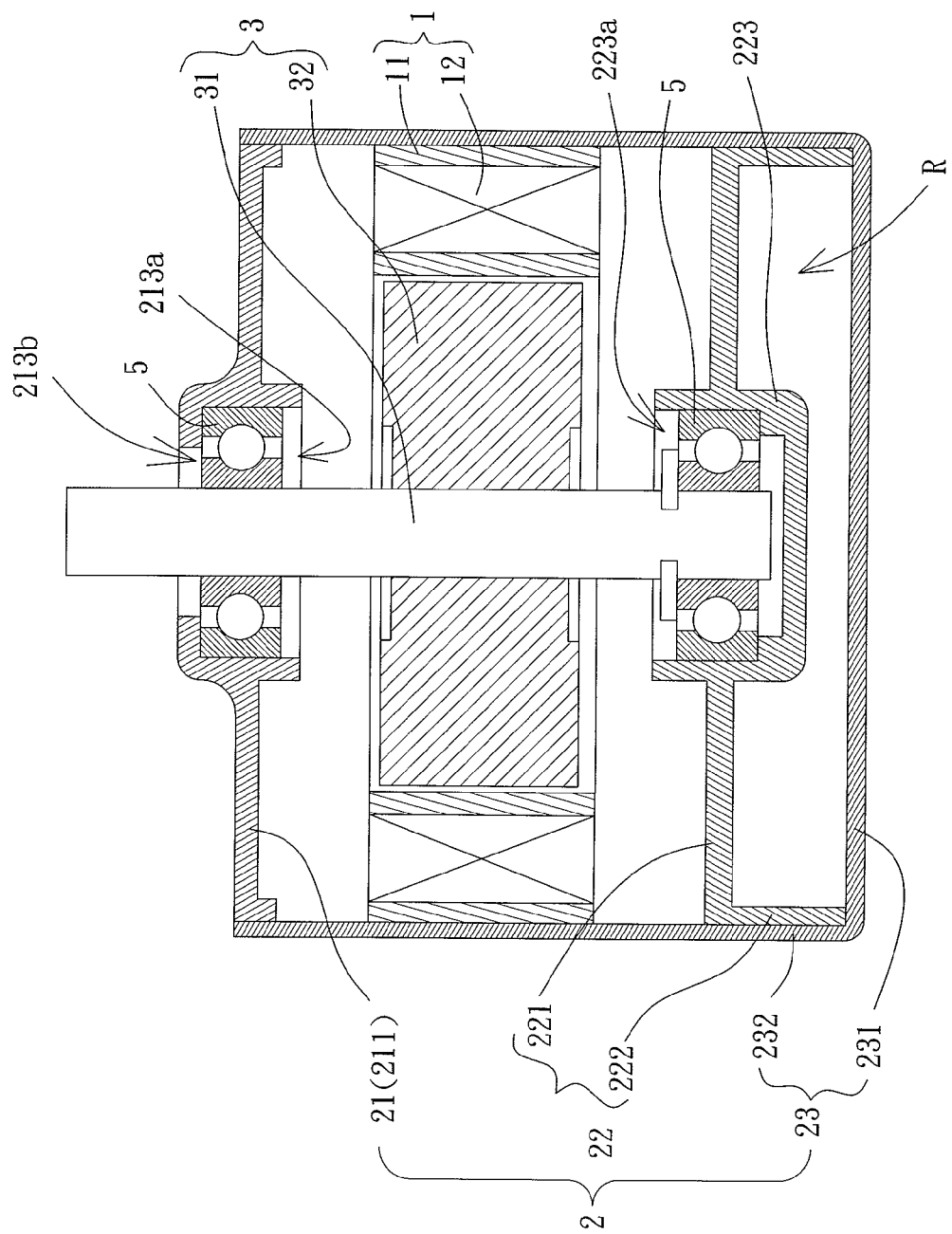
FIG. 8 is a cross sectional view of a motor according to a fourth embodiment of the invention.

FIG. 8 shows a motor according to a fourth embodiment of the invention. This embodiment differs from the previous embodiments in that the lateral wall 232 of the third separating part 23 may extend to the first separating part 21 along the axial direction of the motor. As such, the first separating part 21 may be in a flat form. Namely, the lid 211 of the first separating part 21 does not need to be coupled with any lateral wall. The first and second separating parts 21 and 22 are coupled with the third separating part 23, and are spaced from each other by a portion of the lateral wall 232 of the third separating part 23. Thus, the lids 211 and 221 of the first and second separating parts 21 and 22 form a distance therebetween. However, it can be known from the above embodiments that the lid 221 of the second separating part 22 may be coupled with a further lateral wall which extends to the first separating part 21 in the axial direction of the motor, also forming the first separating part 21 as a plain disc without any lateral wall.

Figure 9:
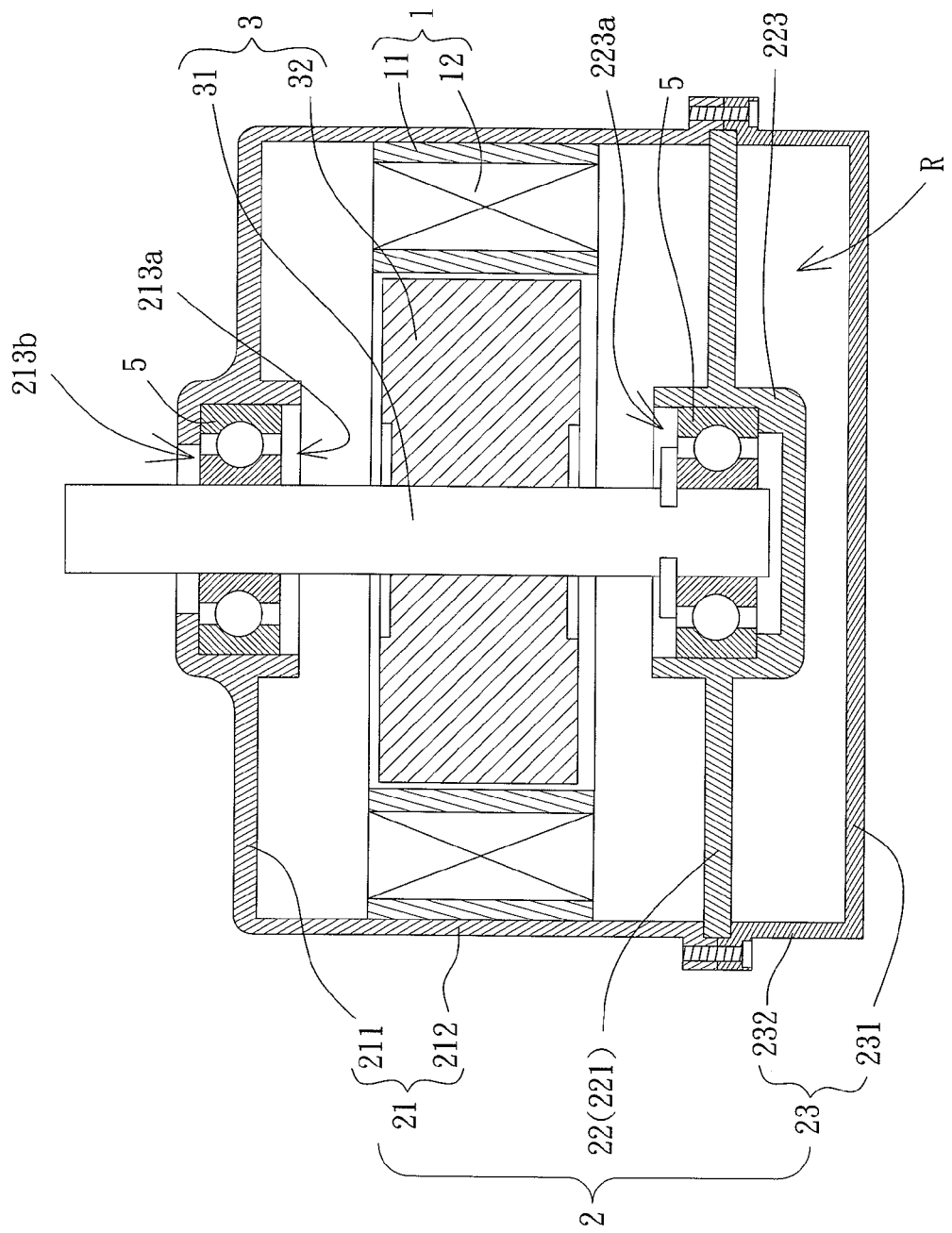
FIG. 9 is a cross sectional view of a motor according to a fifth embodiment of the invention.

FIG. 9 shows a motor according to a fifth embodiment of the invention. This embodiment differs from the previous embodiments in that the second separating part 22 is held between and clamped by the lateral wall 212 of the first separating part 21 and the lateral wall 232 of the third separating part 23. Specifically, the first separating part 21 is coupled with the lateral wall 212 extending from lid 211 to the second separating part 22 along the axial direction of the motor, and the third separating part 23 is coupled with the lateral wall 232 extending from the lid 231 to the second separating part 22 along the axial direction of the motor. In this manner, the second separating part 22 can be securely retained between the first and third separating parts 21 and 23, providing a reinforced positioning of the motor's components.

Figure 10:
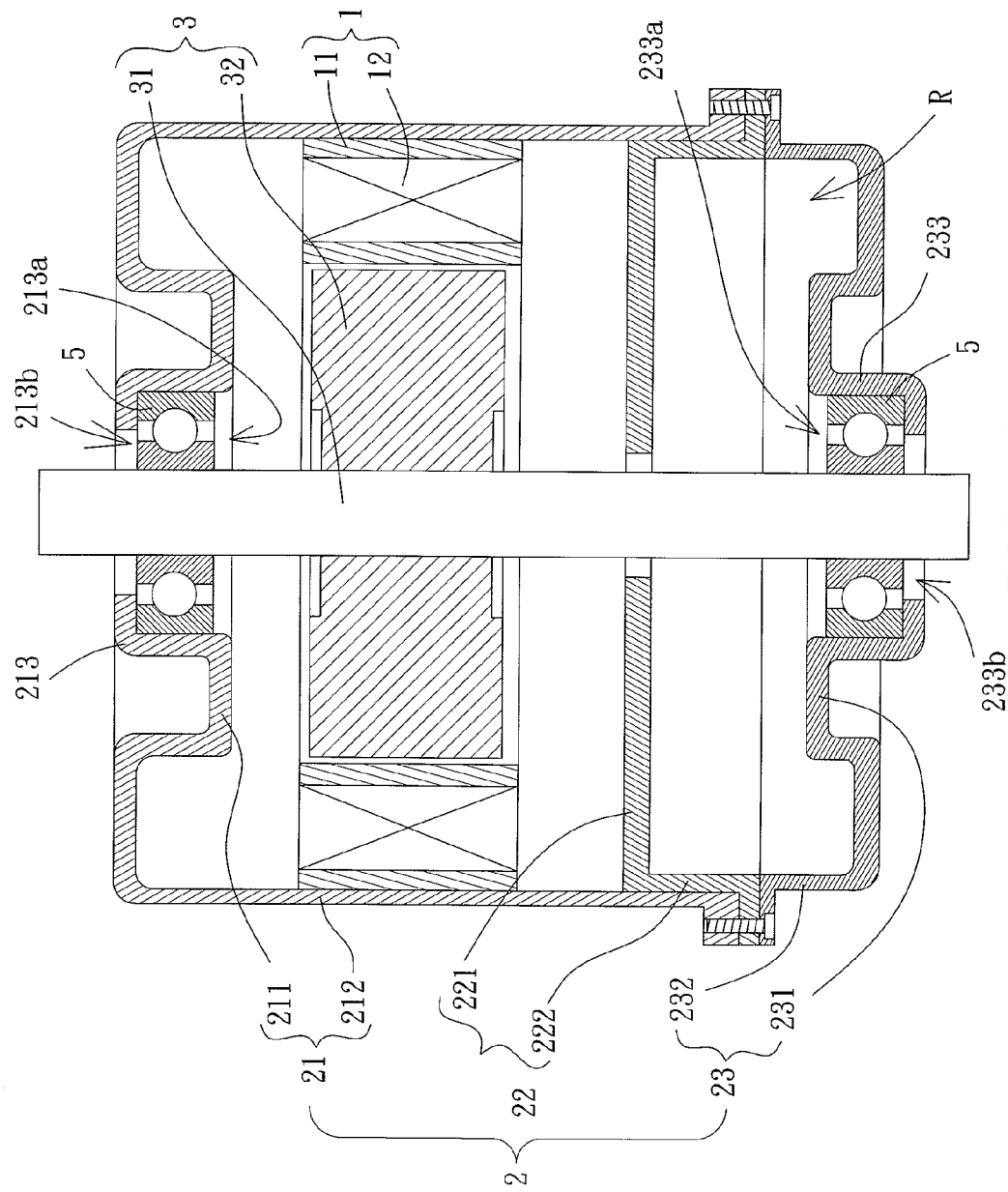
FIG. 10 is a cross sectional view of a motor according to a sixth embodiment of the invention.

FIG. 10 shows a motor according to a sixth embodiment of the invention. In this embodiment, a bearing seat 213 is arranged at the center of the lid 211 of the first separating part 21, and a bearing seat 233 is arranged at the center of the lid 231 of the third separating part 23. Each of the bearing seats 213 and 233 may be provided with a bearing 5. In this arrangement, the shaft 31 may extend through the lid 221 of the second separating part 22 and is rotatably received in the bearings 5 of the bearing seats 213 and 233. Therefore, the rotor 3 can be rotatably coupled with the separating member 2. In other words, the bearing seat 223 that is arranged at the center of the lid 221 of the second separating part 22 in the first to fifth embodiments above can be replaced by a bearing seat 233 arranged in the third separating part 23. The bearing seat 233 also includes an assembly opening 233a. The assembly opening 233a may face towards or away from the second separating part 22. Similarly, the assembly opening 233a also includes a shaft opening 233b. The assembly opening 233a and the shaft opening 233b are arranged at two sides of the bearing seat 233 for the shaft 31 to extend therethrough.

Figure 11:
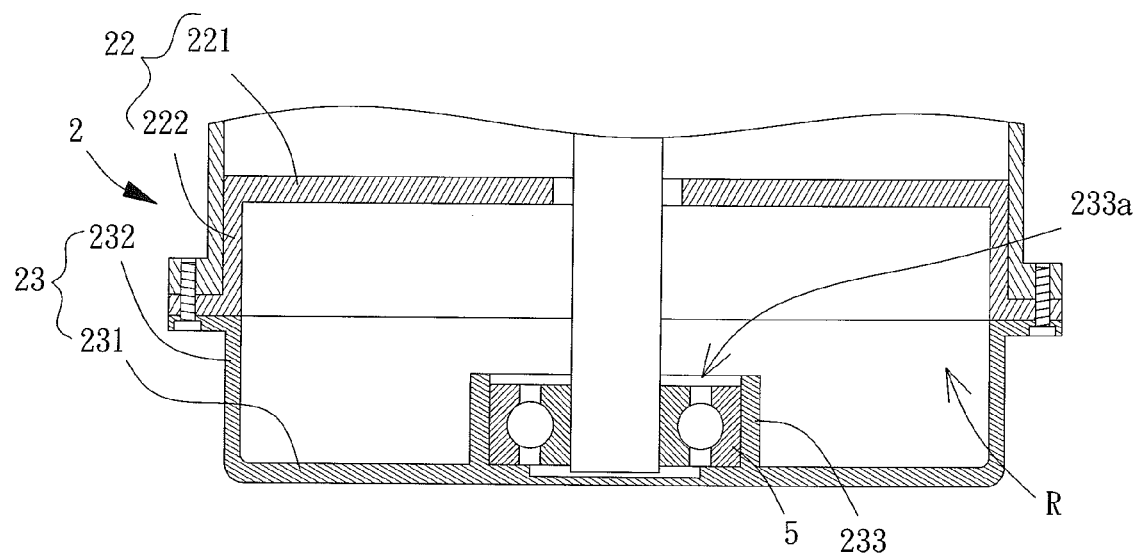
FIG. 11 is a partial, cross sectional view of the motor of the sixth embodiment of the invention where the third separating part is shown according to another implementation of the motor.
Figure 12:
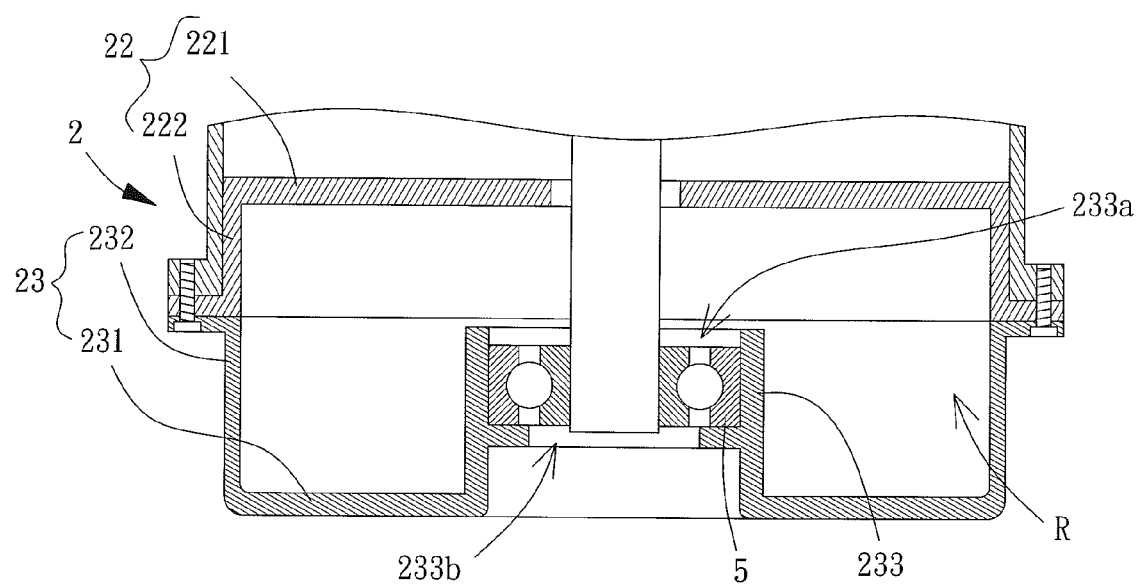
FIG. 12 is a partial, cross sectional view of the motor of the sixth embodiment of the invention where the third separating part is shown according to a further implementation of the motor.

Although it is shown in FIG. 10 that the bearing seat 233 of the third separating part 23 is located outward of the surface of the lid 231 (namely, the axial distance between the bearing seat 233 and the stator 1 is larger than that between the surface of the lid 231 and the stator 1), the outer surface of the bearing seat 233 of the third separating part 23 may also be flush with the outer surface of the lid 231 as shown in FIG. 11. In other words, the bearing seat 233 of the third separating part 23 may be at the same axial level as the lid 231. Alternatively, referring to FIG. 12, the bearing seat 233 and the stator 1 may also be located closer to the stator 1 (namely, the axial distance between the bearing seat 233 and the stator 1 is smaller than that between the surface of the lid 231 and the stator 1).

As compared with the first to fifth embodiments of the invention where the first, second and third separating parts 21, 22 and 23 are combined by connecting each two of the first, second and third separating parts 21, 22 and 23 to each other, the first, second and third separating parts 21, 22 and 23 in this embodiment are combined by simply connecting said separating parts 21, 22 and 23 together. As an example of FIGS. 10, 11 and 12, the first, second and third separating parts 21, 22 and 23 can be screwed together by a single screwing member only.

Figure 13:
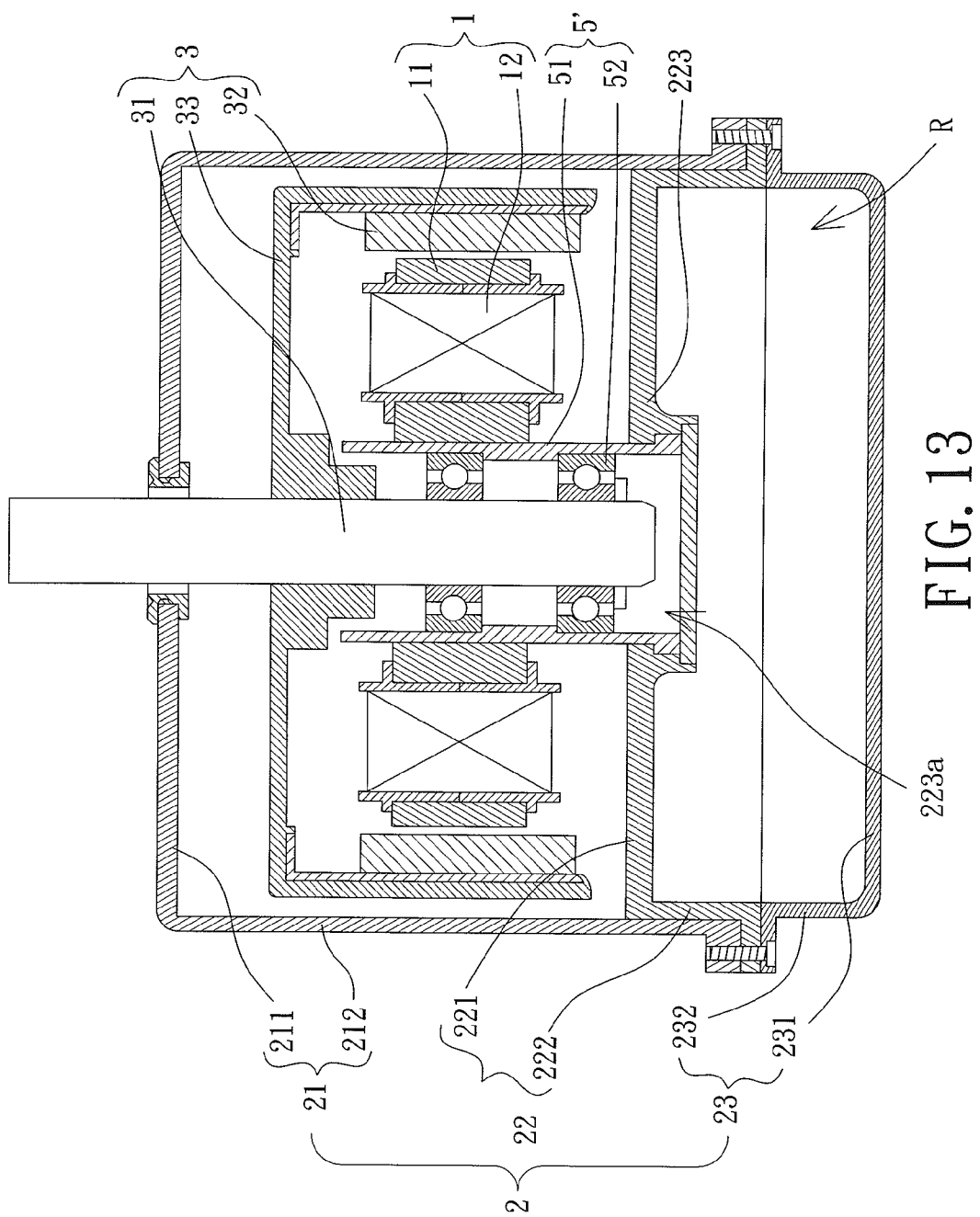
FIG. 13 is a cross sectional view of a motor according to a seventh embodiment of the invention.

Although the motors of the first to sixth embodiments are shown to be inner-rotor-type motors, an outer-rotor-type motor is shown in FIG. 13 according to a seventh embodiment of the invention. Specifically, the outer-rotor-type motor includes a shaft 31, a permanent magnet unit 32 and a hub 33. The hub 33 and the iron core 11 are received in the space formed between the first and second separating parts 21 and 22. The hub 33 may be rotatably coupled with the outer periphery of the shaft 31, and the permanent magnet unit 32 may be coupled with the inner periphery of the hub 33. In this arrangement, the permanent magnet unit 32 is located between the iron core 11 and the separating member 2, forming an air gap between the permanent magnet unit 32 and the iron core 11. As such, the motor of the seventh embodiment is formed.

The iron core 11 may be coupled with the separating member 2 (i.e. coupled with the lid 221 of the second separating part 22). However, in the embodiment, the bearing seat 223 of the second separating part 22 may receive a bearing assembly 5'. The bearing assembly 5' includes a shaft tube 51 and at least one bearing unit 52. The shaft tube 51 is fixed to the bearing seat 223 via the assembly opening 223a, and the at least one bearing unit 52 is received in the shaft tube 51. In this arrangement, since the shaft tube 51 is fixed to the bearing seat 223, the iron core 11 may couple with the outer periphery of the shaft tube 51, and the shaft 31 may be received in the at least one bearing unit 52. As such, there is no need to arrange a bearing seat 213 in the first separating part 21. Similar to the sixth embodiment above, the bearing seat 223 of the second separating part 22 may be removed and a bearing seat 233 of the third separating part 23 may be used to provide the same function of the bearing seat 223.

Figure 14:
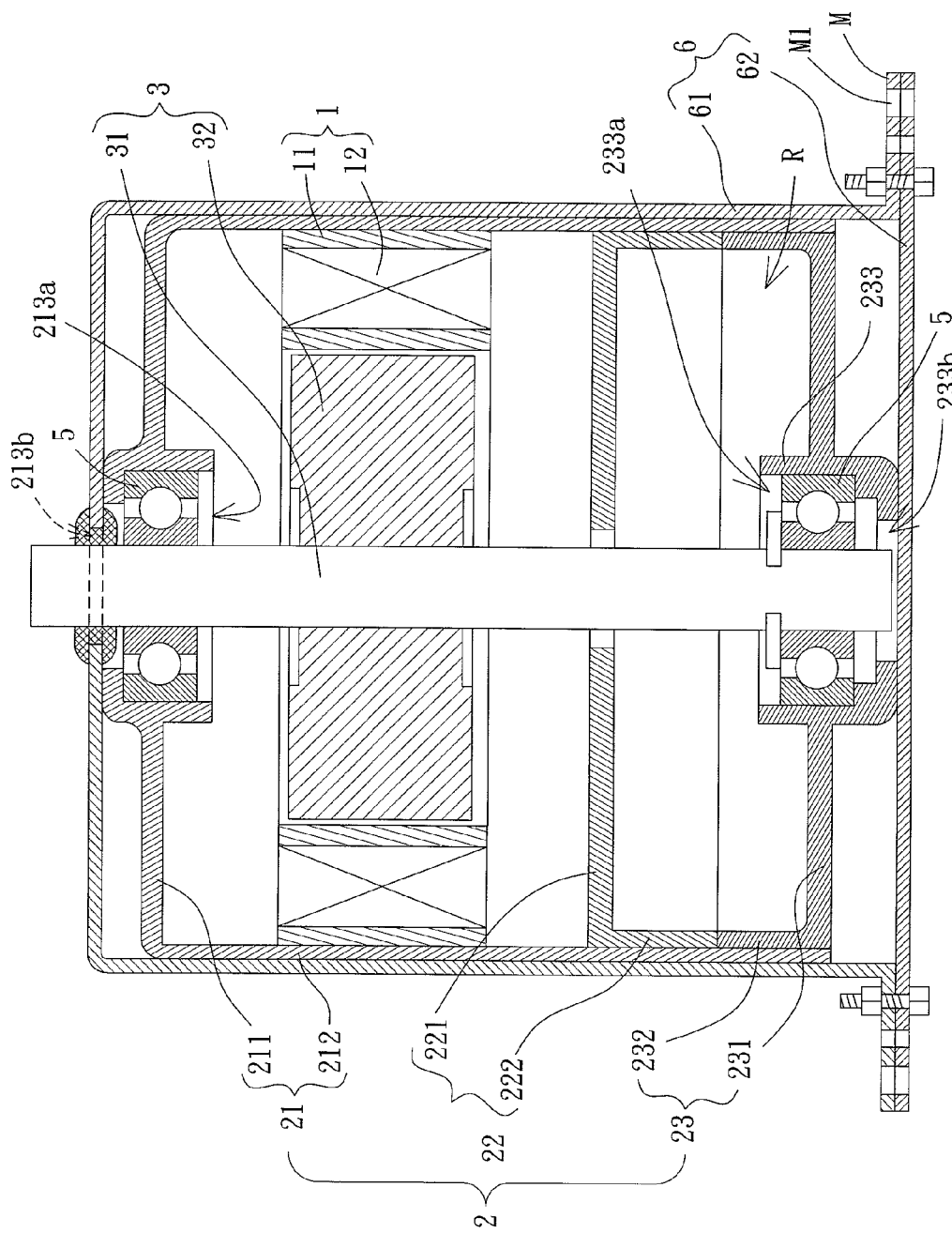
FIG. 14 is a cross sectional view of a motor according to an eighth embodiment of the invention.

FIG. 14 shows a motor according to an eighth embodiment of the invention. This embodiment differs from the first to seventh embodiments in that the motor further includes a metallic housing 6 for receiving the separating member 2 (including the stator 1, the permanent magnet unit 32 of the rotor 3, and the bearing 5/bearing assembly 5'). The separating member 2 may be coupled with the metallic housing 6 by screwing, fastening, press fitting or tenoning. In this manner, enhanced structural strength can be provided by the metallic housing 6, thus achieving an improved insulating effect. As such, the separating member 2 is utilized in every embodiment to prevent generation of the leakage current resulting from an electric current flowing between the stator 1 and the metallic housing 6, thereby providing the desired insulating effect.

Figure 15:
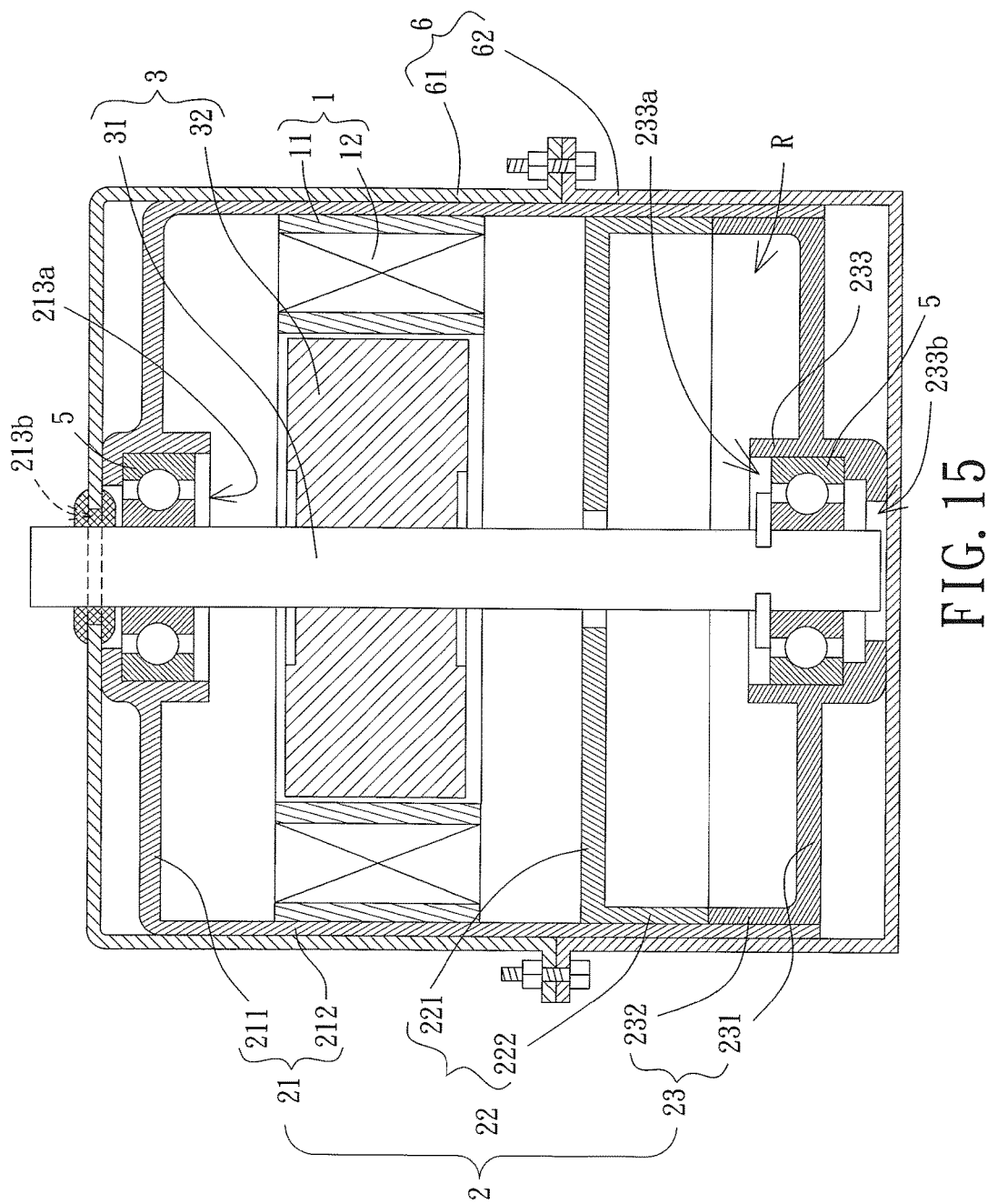
FIG. 15 is a cross sectional view of the motor of the eighth embodiment of the invention where the metallic housing is shown according to another implementation of the motor.

Furthermore, the metallic housing 6 may include a first housing part 61 and a second housing part 62. The first housing part 61 is used to receive the first separating part 21, the second separating part 22 and the third separating part 23 of the separating member 2. The first housing part 61 is a hollow structure and forms an opening at an open end adjacent to the third separating part 23. The second housing part 62 is detachably attached to the first housing part 61 to cover the opening of the first housing part 61. As such, the separating member 2 can be completely received in the metallic housing 6. Referring to FIG. 15, the second housing part 62 may also form a hollow structure. In this regard, the second housing part 62 forms an opening at an open end thereof. The open ends of the first and second housing parts 61 and 62 abut with each other, such that the first and second housing parts 61 and 62 jointly enclose the first separating part 21, the second separating part 22 and the third separating part 23 of the separating member 2. The second housing part 62 and the third separating part 23 can be removed from the motor for replacement or repair of the driving circuit board, the electrical control module or the power converting unit inside the receiving portion "R." Besides, an adapter "M" may be mounted to the outer periphery of the metallic housing 6. In this regard, the adapter "M" includes a plurality of fixing holes M1 so that the motor of the invention can be fixed to different products, improving the utility of the motor and providing convenient assembly of said motor.

FIG. 16 shows a motor according to a ninth embodiment of the invention. This embodiment differs from the eighth embodiment in that the first housing part 61 is in the form of a hollow sleeve having two openings at two ends thereof, and the motor includes two covers 63 in addition to the first housing part 61. In this regard, the first housing part 61 encloses the first, second and third separating parts 21, 22 and 23 in a manner that one opening of the first housing part 61 is adjacent to the first separating part 21 and the other opening of the first housing part 61 is adjacent to the third separating part 23. Based on this, the first housing part 61 is sealed by the two covers 63 at the two openings thereof. As such, the separating member 2 can be sealed in the metallic housing 6 to provide an improved protection effect. In the embodiment, the two covers 63 can be fixed to each other by screwing in order to jointly hold the first housing part 61 therebetween. Moreover, the cover 63 adjacent to the first housing part 61 may have a through hole "H" through which the shaft 31 can extend out of the metallic housing 6. Said cover 63 may have at least one screwing hole 631 arranged at the outer surface facing away from the stator 1. In this arrangement, the two covers 63 are able to provide the same screwing function as the adapter "M," in order for the motor to be screwed to different electronic devices.

Based on the aforementioned structure, the motor of the embodiment is characterized as follows.

The first and second separating parts 21 and 22 are used to enclose the stator 1 and the bearing 5, and the driving circuit board, the electrical control module and the power converting unit of the motor are received in the receiving portion "R" formed between the second and third separating parts 22 and 23. Based on this, the separating member 2 can completely enclose and insulate said components from the housing. Advantageously, leakage current is prevented. As compared with the conventional motor 9 where a leakage current may be conducted on the stator 91, the driving circuit and the bearing through the two axial sides of the separating member 92, the motor in each embodiment of the invention does possess an improved insulation function. In addition, since the separating member 2 completely encloses the stator 1 in both axial and radial directions, the moisture is not liable to enter the motor. As compared with the conventional motor 9 where moisture can enter the motor through the openings of the separating member 92 and therefore cause oxidization of or damage to the internal components of the motor 9, the motor in each embodiment of the invention does possess a longer service life.

Furthermore, the third separating part 23 may be detachably attached to the first separating part 21 or the second separating part 22 by screwing, fastening or tenoning. The third separating part 23 can be removed from the motor for replacement or repair of the driving circuit board, the electrical control module or the power converting unit of the motor inside the receiving portion "R." As such, convenient assembly and repair of the motor are achieved.

Besides, the bearing seats 213, 223 and 233 may be respectively formed on the first, second and third separating parts 21, 22 and 23. Based on this, the bearing 5 can be easily coupled to the bearing seats 213, 223 and 233, providing a convenient assembly of the motor. Thus, the motor in each embodiment of the invention does simplify the production procedure of the motor.

From the above description, it can be known that the motor in each embodiment of the invention does provide advantages such as improved insulating effect, prolonged service life, convenient assembly and simplified production procedure.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A motor comprising:
   a stator comprising an iron core;
   a separating member made of insulating material and comprising a first separating part, a second separating part and a third separating part, wherein the second separating part is arranged between the first and third separating parts, and wherein the iron core is arranged between the first and second separating parts;
   a rotor rotatably coupled with the separating member and comprising a permanent magnet unit arranged between the first and second separating parts; and
   a metallic housing receiving an entirety of the separating member and including a first housing part and two covers, wherein the first housing part is in a form of a hollow sleeve having two openings at two ends thereof, wherein the first housing part radially encloses the separating member and the first, second and third separating parts, and wherein the two covers respectively cover the two openings of the first housing part and axially enclose the separating member and the first, second and third separating parts.

2. The motor as claimed in claim 1, wherein the second and third separating parts jointly form a receiving portion adapted to receive a driving circuit board, an electrical control module or a power converting unit.

3. The motor as claimed in claim 1, wherein each of the first, second and third separating parts comprises a lid extending in a radial direction.

4. The motor as claimed in claim 3, wherein the lid of the first separating part comprises a lateral wall extending towards the second separating part in an axial direction perpendicular to the radial direction, or the lid of the second separating part comprises a lateral wall extending towards the first separating part in the axial direction.

5. The motor as claimed in claim 4, wherein the first and second separating parts are spaced from each other via the lateral wall of the first or second separating part.

6. The motor as claimed in claim 3, wherein the lid of the first separating part comprises a lateral wall extending towards the second separating part in an axial direction perpendicular to the radial direction, and the lid of the second separating part comprises a lateral wall extending towards the first separating part in the axial direction.

7. The motor as claimed in claim 1, wherein the lid of the third separating part comprises a lateral wall extending towards the second separating part in an axial direction, or the lid of the second separating part comprises a lateral wall extending towards the third separating part in the axial direction.

8. The motor as claimed in claim 7, wherein the second and third separating parts are spaced from each other via the lateral wall.

9. The motor as claimed in claim 3, wherein the rotor further comprises a shaft, wherein a bearing seat is arranged at the center of the lid of each of the first and second separating parts, wherein each of the bearing seats comprises an assembly opening, wherein a bearing is received in each of the bearing seats via the assembly opening, and wherein the shaft is rotatably received in the bearings of the bearing seats of the first and second separating parts.

10. The motor as claimed in claim 9, wherein the assembly opening of the bearing seat of the first separating part faces towards or away from the second separating part, and the assembly opening of the bearing seat of the second separating part faces the first or third separating part.

11. The motor as claimed in claim 9, wherein the bearing seat of the first separating part further comprises a shaft opening through which the shaft of the rotor extends, and wherein the assembly opening and the shaft opening of the first separating part are arranged at two sides of the bearing seat of the first separating part.

12. The motor as claimed in claim 1, wherein the first and second separating parts are coupled with each other, and wherein the second and third separating parts are coupled with each other, thereby coupling the first, second and third separating parts together.

13. The motor as claimed in claim 1, wherein one of the two covers axially encloses an end of the rotor.

* * * * *